United States Patent [19]
Shaw

[11] Patent Number: 5,874,521
[45] Date of Patent: *Feb. 23, 1999

[54] POLYMER AHOY MATERIAL AND PROCESS FOR PRODUCTION THEREOF

[75] Inventor: William J.D. Shaw, Calgary, Canada

[73] Assignee: University Technologies International Inc., Calgary, Canada

[*] Notice: The term of this patent shall not extend beyond the expiration date of Pat. No. 5,367,048.

[21] Appl. No.: 345,336

[22] Filed: Nov. 21, 1994

Related U.S. Application Data

[63] Continuation-in-part of Ser. No. 901,163, Jun. 19, 1992, Pat. No. 5,367,048.

[51] Int. Cl.$^6$ .................................................. C08G 73/00
[52] U.S. Cl. ..................... 528/367; 528/422; 528/502; 528/503; 525/191; 525/232; 525/233; 525/234; 521/134; 521/921
[58] Field of Search ................................ 528/367, 422, 528/502, 563; 525/501, 191, 232, 233, 234; 521/134, 921

[56] References Cited

U.S. PATENT DOCUMENTS 5,004,778  4/1991  Waagen et al. ........................ 524/474
5,021,523  6/1991  Iizuka ..................................... 525/537
5,367,048  11/1994  Shaw .................................... 528/367

Primary Examiner—Duc Truong
Attorney, Agent, or Firm—Fitzpatrick, Cella, Harper & Scinto

[57] ABSTRACT

A reactive, powdered polymeric material, the polymeric material comprising polymer particles (i) having an average particle size less than about 1000 μm; (ii) which are made up of a plurality of smaller particles; and (iii) having energy stored therein. A process for producing the powdered polymeric material is described. The process comprises the steps of: (i) placing polymeric material in a milling chamber equipped with impact means; (ii) accelerating the impact means to at least about 50 ml/s$^2$; (iii) impacting the polymeric material with the impact means; (iv) repeatedly welding and fracturing the polymeric material; and (v) repeating Steps (ii), (iii) and (iv) until a powdered polymeric material is produced having an average particle size less than about 1000 μm. During Steps (iii) and (iv), the temperature of the milling chamber is maintained below the glass transition temperature of the polymeric material. The powdered particulate material particularly suited for processing a single polymer or a mixture of two or more polymers which are otherwise difficult to process at a temperature less than the melting point of the polymer to produce a polymer alloy having desirable physical properties.

13 Claims, 12 Drawing Sheets

5,874,521

POLYMER ALLOY MATERIAL AND PROCESS FOR PRODUCTION THEREOF

CROSS-REFERENCE TO RELATED APPLICATION

This patent application is a continuation-in-part of application Ser. No. 07/901,163, filed Jun. 19, 1992, now U.S. Pat. No. 5,367,048, granted on Nov. 22, 1994.

BACKGROUND OF THE INVENTION

1. Field of the Invention

The present invention relates to a polymer alloy material and to process for production thereof. The present invention also relates to a powdered polymeric material useful for producing the polymer alloy material and to a process for production thereof.

2. Description of the Prior Art

Mechanical alloying was developed in 1968 by J. S. Benjamin and is described in "Dispersion Strengthened Superalloys by Mechanical Alloying", Metall. Trans, Vol. 1, pg. 2493 (1970), the contents of which are herein incorporated by reference. Initial efforts at mechanical alloying were aimed at producing an alloy combining oxide dispersion strengthening with gamma prime precipitation hardening in a nickel-based superalloy intended for gas turbine applications. Over time, the mechanical alloying process evolved from production of complex oxide dispersion strengthened (ODS) alloys to a process for producing composite metallic powders capable of yielding alloys with controlled, extremely fine microstructures. Accordingly, it is known that the mechanical alloying process may be used to produce metal alloys that are otherwise difficult or impossible to produce utilizing conventional melt techniques.

Generally, mechanical alloying comprises two steps. In the first step, the material to be alloyed is introduced into a high energy ball mill and is ground over a long period of time to produce an extremely fine powder by the mechanism of repeatedly fracturing and cold welding the fine powder particles. Each fine powder particle is comprised of a very uniform mixture of the various elements comprising the alloy. The second step in the process comprising consolidating the fine powder particles below the melting point of the material by using controlled amounts of pressure, time and temperature as described in P. S. Gilman et al. in "Mechanical Alloying", Ann. Rev. Mater. Sci., Vol. 13, pg. 279 (1983), the contents of which are hereby incorporated by reference.

Polymers are materials which have widespread applicability due to their relatively low density, low cost and their ability to be easily shaped for their intended purpose. Conventionally, it has been convenient to process polymeric materials to make them into useful articles by utilizing thermoforming techniques wherein the polymer is heated to a point where it will flow at a reasonable rate under applied stress. Examples of such known thermoforming techniques include extrusion, injection molding and calendering. Unfortunately, these techniques cannot be applied to many polymers having a high melting point since such polymers remain as solids up to the point of degradation (D. M. Bigg, Polymer Engineering and Science, 17 (9), pg. 691 (1977)). Additionally, many polymers are physically incompatible when melted and mixed together resulting in phase separation thereof to produce a nonhomogeneous material having nonuniform physical properties. Thus, attempts at alloying polymeric materials have generally been limited to production of polymeric alloys based on using chemical reactions, such as block and graft copolymerization and interpenetrating polymer network techniques as described by L. H. Sperling in "Interpenetrating Polymer Networks and Related Materials", Plenum Press (1981), the contents of which are hereby incorporated by reference.

It would be desirable to have an improved process for producing an alloyed polymeric material comprising at least one polymer which could be applied to a larger variety of polymers.

SUMMARY OF THE INVENTION

It is an object of the present invention to provide a novel polymer alloy material.

It is another object of the present invention to provide a process for producing a polymer alloy material.

It is yet another object of the present invention to provide a novel powdered precursor material useful for, inter alia, producing a polymer alloy material.

It is yet another object of the present invention to provide a process for producing a powdered precursor material useful for producing a polymer alloy material.

Accordingly, in one of its aspects, the present invention provides a polymer alloy material when produced by a process comprising the step of:

heating a powdered precursor material comprising polymer particles having an average particle size less than about 1000 $\mu$m to a temperature less than the melting point of the polymer at a pressure of at least about 5 MPa to produce the polymer alloy material.

In another of its aspects, the present invention provides a process for producing a polymer alloy material comprising the step of:

heating a powdered precursor material comprising polymer particles having an average particle size less than about 1000 $\mu$m to a temperature less than the melting point of the polymer at a pressure of at least about 5 MPa to produce the polymer alloy material.

In yet another of its aspects, the present invention provides a process for producing a polymer alloy material comprising the steps of:

mechanically milling a polymer to provide a powdered precursor material having an average particle size less than about 1000 $\mu$m; and heating the powdered precursor material to a temperature less than the melting point of the polymer at a pressure of at least about 5 MPa to produce the polymer alloy material.

In yet another of its aspects, the present invention provides a powdered polymeric material, the polymeric material comprising polymer particles (i) having an average particle size less than about 1000 $\mu$m; (ii) which are made up of a plurality of smaller particles; and (iii) having energy stored therein.

In yet another of its aspects, the present invention provides a process for producing a powdered polymeric material, the process comprising the steps of:

(i) placing polymeric material in a milling chamber equipped with impact means;

(ii) accelerating the impact means to at least about 50 m/s$^2$;

(iii) impacting the polymeric material with the impact means;

(iv) repeatedly welding and fracturing the polymeric material; and (v) repeating Steps (ii), (iii) and (iv) until a powdered polymeric material is produced having an average particle size less than about 1000 μm;

wherein, during Steps (iii) and (iv), the temperature of the milling chamber is maintained below the glass transition temperature of the polymeric material.

The terms "powdered polymeric material" and "powdered precursor material", when used throughout this specification in reference to the present invention, are intended to have the same meaning.

Thus, it has been discovered that, by subjecting a polymer to certain process steps, a polymer alloy material may be consolidated at a temperature below the melting point of the polymer. It should be appreciated that the term "polymer alloy material", as used in reference to the present invention, encompasses a material comprising a single polymer or a mixture of two or more polymers. Although the term "alloy" is typically used in reference to a mixture of two or more components, it has been discovered that a single polymer which is otherwise difficult to process using conventional techniques, for example due to degradation during thermoforming, may be suitably processed in accordance with the present invention while minimizing or inhibiting such degradation. Accordingly, the terms "alloy", "alloyed" and "alloying", when used in reference to the present invention, are intended to encompass materials having a single polymer or a mixture of two or more polymers. When a mixture of two or more polymers is used, heating of the powdered precursor material should be conducted at a temperature less than the lowest melting point of the individual polymer components.

It has been discovered that the present polymer alloy material may be made by consolidating a prepared powdered precursor material comprising polymer particles having an average particle size less than about 1000 μm at temperature less than the melting point of the polymer. In one aspect of the invention, consolidation of the powdered precursor material is preceded by production thereof utilizing a mechanical milling technique. In this aspect of the invention, a mechanically alloyed polymer is produced: this is a surprising and unexpected discovery.

The polymer alloy material of the present invention exhibits superior physical properties when compared to a similar polymeric material made utilizing conventional thermoforming techniques. This is a surprising and unexpected discovery, especially since the polymer alloy is consolidated at a temperature less than the melting point of the polymer therein.

An aspect of the present invention relates to the discovery of a powdered polymeric material which, inter alia, is useful to produce polymer alloys. A novel feature of the powdered polymeric materials is the ability to be consolidated to a solid material at a pressure of at least about 70 kPa and a temperature of at least about 25° C., preferably at least about 70° C., more preferably at least about 85° C., most preferably at least about 100° C., below the melting point of the polymeric material.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Figure 1:
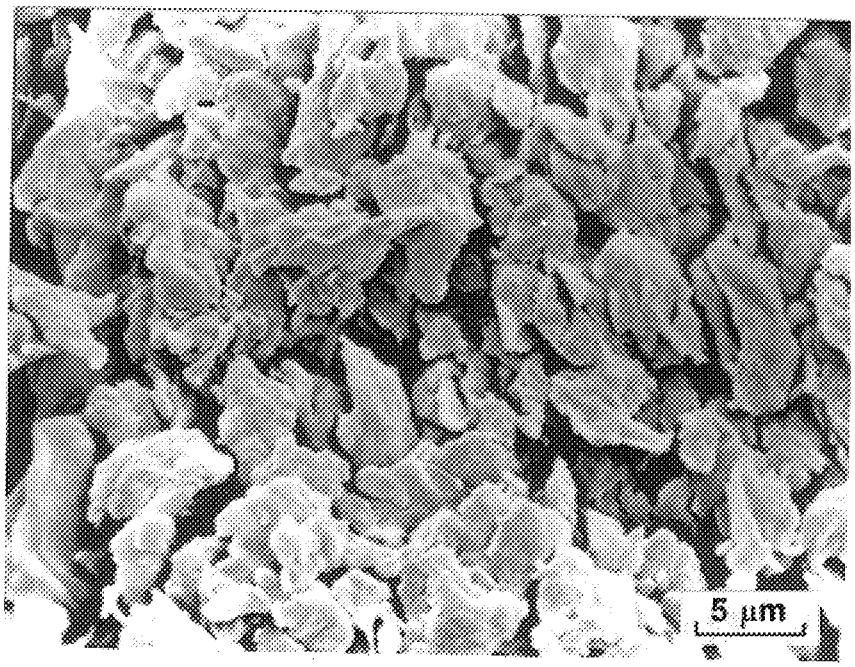
FIG. 1 is an electron micrograph of a mechanically milled powdered precursor (polyamide) material.

The present invention is applicable to virtually all polymers which are conventionally processed by, inter alia, the application of heat. Generally, it is preferred to use a polymer which is a thermoset or a thermoplastic. Non-limiting examples of polymers suitable for use herein may be selected from the group comprising polycarbonate, poly (methyl methacrylate), poly(amide-imide), polyacryleneketone,poly(acrylonitrile-butadiene-styrene), polyetheretherketone, poly(phenol-formaldehyde), polyphenol, polyester, polacrylate, polyeryl sulfone, poly (ether-imide), polyether sulfone, poly(ethylene terephthalate), polyacrylonitrile, polyamide, polystyrene, poly(vinyl chloride), poly(vinyl alcohol), polychlorotrifluoroethylene, epoxy, polycyanate, polymethylpentene, poly(vinyl acetate), poly(vinylidene chloride), poly(vinyl fluoride), polychloroprene, poly (vinylidene fluoride), poly(ethylene oxide), polyoxymethylene, polyisoprene, polyisobutylene, polyethylene, polybutadiene and substituted derivatives thereof. The preferred polymer for use herein is polyamide (e.g. nylon 6,6).

The present polymer alloy may be produced by consolidating a powdered precursor polymeric material. The powdered precursor material, which forms an aspect of the present invention, comprises polymer particles (i) having an average particle size less than about 1000 μm; (ii) which are made up of a plurality of smaller particles; and (iii) having energy stored therein.

There are two features powdered precursor polymeric material which are characteristic of the energy stored therein: (1) the ability to be consolidated at a temperature below the melting point of the polymer; and (2) a unique density relationship.

With regard to feature (1), the powdered precursor polymeric material is able to be consolidated to a solid material at a pressure of at least about 70 kPa and temperature of at least about 25° C., preferably at least about 70° C., more preferably at least about 85° C., most preferably at least about 100° C., below the melting point of the polymeric material. This is believed to be direct evidence of energy storage in the powdered precursor polymeric material. While not wishing to be bound by any particular theory or mode of action, it is believed that the energy stored in the polymer particles, consolidated with low temperature heat energy below the melting point of the polymer particles, allows for diffusion or movement of the polymer chain ends to occur as well as for chemical and mechanical bond formations to occur. Further, it is believed that the fact that the powdered precursor polymeric material can be consolidated below its melting point is evidence mechanical milling has served to lower the activation energy of the polymer particles.

With regard to feature (2), the presence of energy stored in the powdered polymeric material can be confirmed by measuring the density of a sample of the powdered polymeric material which has been consolidated or consolidated/heat treated (i.e. maintaining the consolidated material at elevated temperature below the melt point of the polymer for a period of time at otherwise ambient conditions) at a temperature less than the melting point of the polymer (DENSITY 1). The density of thermal polymer material (i.e. conventionally available) consolidated at or above the melting point of the polymer is then determined (DENSITY 2). If either: (i) DENSITY 1 increases as the powdered polymeric material is consolidated at progressively higher temperatures and/or for longer periods, and approaches DENSITY 2; or (ii) previously consolidated material is heat treated by holding at higher temperatures for a period of time at atmospheric pressure and DENSITY 1 increases accordingly with time and temperature approaching DENSITY 2, then the powdered polymeric material is characterized by having energy stored therein. This is a material which is free of porosity or microscopic voids at magnifications up to about 2000 times.

A preferred process for producing the powdered polymeric material comprises the steps of:

(i) placing polymeric material in a milling chamber equipped with impact means;

(ii) accelerating the impact means to at least about 50 m/s$^2$;

(iii) impacting the polymeric material with the impact means;

(iv) repeatedly welding and fracturing the polymeric material; and (v) repeating Steps (ii), (iii) and (iv) until a powdered polymeric material is produced having an average particle size less than about 1000 μm;

wherein, during Steps (iii) and (iv), the temperature of the milling chamber is maintained below the glass transition temperature of the polymeric material.

Thus, the process involves mechanical milling of polymeric material to produce a powdered polymeric material which, in one embodiment, is particularly useful in the production of polymer alloy material. It should be appreciated that the term "mechanically milling", as used throughout this specification with respect to a polymer, encompasses mechanical working of polymer to effect repeated fracturing and welding thereof. The precise manner by which mechanical milling is effected and the equipment used to effect mechanical milling can be varied according to a number of factors such as the volume of polymer material to be produced, the type of polymer or polymers being milled and the like.

In Step (i) of the process, the polymeric material is placed in a milling chamber equipped with impact means.

Preferably, the milling chamber is a ball mill capable of providing an overall acceleration of at least about 10 g's (i.e. at least about 50 m/s$^2$). In this embodiment, the ball mill is equipped with a plurality of generally spherical balls which are used to impact the polymer material being milled. As is well known in the art, the operating frequency of the ball mill is inversely related to processing time required to achieve a certain average particle size and mechanical intermixing of the individual particles. Examples of suitable ball mills include a high-speed shaker ball mill for small size samples (several grams) and a high energy ball mill comprising a vertical drum with a series of impellers therein which are rotated by a powerful motor thereby agitating steel balls in the drum—see J. S. Benjamin, supra, incorporated herein by reference.

As will be apparent to those of skill in the art, the type of equipment used is not particularly restricted provided that it is equipped with impact means capable of: accelerating the impact means to at least about 50 m/s$^2$ (Step (ii) of the process); impacting the polymeric material with the impact means (Step (iii) of the process) thereby transferring energy from the impact means to the polymer material; and repeatedly welding and fracturing the polymeric material (Step (iv) of the process). In Step (iii), "impacting" is used broadly to mean that energy is being transferred from the impact means (i.e. operating as grinding media) to the polymer material. In certain cases, the energy may be transferred by vibration, friction or other forces. While a ball mill has been described as the preferred equipment for use, other types of mills can be used or adapted for use with the present process. The following mills are also useful for producing a suitable powdered polymeric material: vibrating-shaker mills, drop mills, horizontal ball or rod mills (adapted to generate high impact conditions) and crusher mills.

Step (ii) comprises accelerating the impact means to at least about 50 m/s$^2$. Preferably, the impact means is accelerated to at least about 100 m/s$^2$, more preferably at least about 110 m/s$^2$, most preferably at least about 120 m/s$^2$. The upper limit of acceleration is not particularly restricted and can be as high as 200 m/s$^2$ to 500 m/s$^2$ or even more. However, it may be impractical and/or prohibitively expense to use such high acceleration rates.

In Step (v) of the process, acceleration of the impact means (Step (ii)), impacting the polymer material (Step (iii)), and repeated fracturing welding of the polymer material (Step (iv)) are repeated until the a powdered polymeric material is produced having an average particle size less than about 1000 μm. Preferably, Step (v) is conducted until a powdered polymeric material is produced having an average particle size in the range of from about 0.1 μm to about 200 μm, more preferably in the range of from about 0.1 μm to about 50 μm, even more preferably in the range of from about 0.1 μm to about 30 μm, most preferably in the range of from about 0.1 μm to about 10 μm. If a ball mill is used, the duration of mechanical milling (i.e. generally governed by the duration of Step (v)) is not particularly restricted provided that it be sufficient to achieve the desired average particle size of the powdered precursor material and, preferably, to achieve intermixing within individual particles. Generally, the polymer material will be processed for a period of time sufficient to provide the necessary average particle size for the powdered precursor material. Typically, with current ball mills, the period of time may be at least about 1 hour, preferably from about 6 hours to about 24 hours or longer. It will be appreciated by those of skill in the art that, as improvements are made to currently available ball mills, the processing period will be reduced.

During Steps (iii) and (iv) of the process, the temperature of the milling chamber is maintained at a temperature below the glass transition temperature of the polymer being mechanically milled. In the case of a mixture of two or more polymers, it is preferred that the reaction chamber in the ball mill be maintained at a temperature below the lowest glass transition temperature of the individual polymers being mechanically milled. Preferably, the temperature of the milling chamber is maintained at a temperature of least about 25° C., more preferably at least about 70° C., even more preferably at least about 85° C., most preferably at least about 100° C., below the glass transition temperature of the polymer being mechanically milled.

Preferably, during Steps (iii) and (iv) of the process, the temperature of the of the milling chamber is maintained at a temperature of less than about −50° C., more preferably less than about −100° C., most preferably less than about −130° C. Typically, the maintenance of the temperature during Steps (iii) and (iv) of the process involves cooling the milling chamber. Such cooling may be effected by contacting the outside of the ball mill chamber with liquid nitrogen or any other suitable refrigerant (e.g. HCFC's, CFC's, liquid $CO_2$ and the like) which serves to lower the temperature in the chamber to below −150° C.

The environment in which Steps (ii), (iii) and (iv) are conducted is not particularly restricted. Thus, these Steps of mechanical milling can be conducted in air, an inert environment (e.g. under argon or the like) or under a vacuum.

The polymer alloy material is formed by consolidation of the powdered precursor (polymeric) material. Specifically, the powdered precursor material is heated to a temperature less than the melting point of the polymer at a pressure of about 70 kPa to produce the polymer alloy material. The preferred temperature is defined by the range of from about 75° C. less than the melting point of the polymer up the melting point of the polymer, more preferably from about 50° C. less than the melting point of the polymer up the melting point of the polymer, most preferably from about 25° C. less than the melting point of the polymer up the melting point of the polymer. The preferred pressure is at least about 5 MPa, more preferably at least about 10 MPa, even more preferably at least about 30 MPa, most preferably at least about 55 MPa.

The powdered precursor material is subjected to heat and pressure for a period sufficient to effect consolidation thereof. The actual period of time required for consolidation can be easily ascertained by a person skilled in the art and depends on factors such as temperature, type of polymer(s), average particle size of powdered precursor material and the like.

Consolidation may be conducted in a consolidation press which is known to those skilled in the art.

In a preferred embodiment of the consolidation step, the powdered precursor material is pretreated prior to consolidation thereof. This pretreatment step preferably comprises maintaining the powdered precursor material at a temperature in the range of from about 50° to about 100° C. under vacuum for a period of at least about 5 minutes, more preferably in the range of from about 5 to about 25 hours, to degas the powdered precursor material.

The pretreatment step is especially preferred when using a polymer which is reactive to the environment(e.g. moisture, oxygen and the like). Non-limiting examples of such polymers include EPON, cellulose acetate, nylon 6/6, ionomers, cellulose propionate, nylon 6, poly(vinyl butyral), cellulose nitrate, poly(vinyl formate), cellulose acetate butyrate, ethyl cellulose, nylon 11, polyimides, melamine-phenol resin, melamine-formaldehyde resin, poly(methyl methacrylate), poly(acrylonitrile-butadiene-styrene), polyoxymethylene, nylon 12, poly(aryl ether), polysulfones, polyesters, polycarbonates and substituted derivatives thereof.

Embodiments of the present invention will be described with reference to the following Examples which are not intended to limit the scope of the invention.

EXAMPLE 1

The polymer used in this Example was nylon 6,6, a semi-crystalline polyamide commercially available from E.I. duPont de Nemours & Co.

To produce a polymer alloy material falling within the scope of the present invention, reactor grade polyamide pellets and a mechanically cut polyamide powder precursor material having an average particle size of 200 μm were used. For comparison purposes, the reactor grade polyamide pellets were thermoformed at 285° C. (melting point of material is 260° C.) using conventional techniques to produce a billet for testing purposes. For convenience, the samples discussed in this Example may be identified as follows:

| Sample | Identification |
| --- | --- |
| Mechanically Cut polyamide Polymer Alloy | MCPA |
| Mechanically Milled polyamide Polymer Alloy | MMPA |
| Thermally Processed PolyAmide | TPPA |

The reactor grade polyamide pellets were initially mechanically milled in a shaker ball mill which was operated at an overall acceleration of 12.3 g's at a frequency of 29 Hz. The ball mill chamber was cooled using liquid nitrogen to provide a temperature below −150° C. which corresponds to about 100° C. below the glass transition temperature of the polyamide. The polyamide pellets were processed for 24 hours at the end of which the mechanically milled powdered precursor material was removed from the ball mill chamber.

Figure 2:
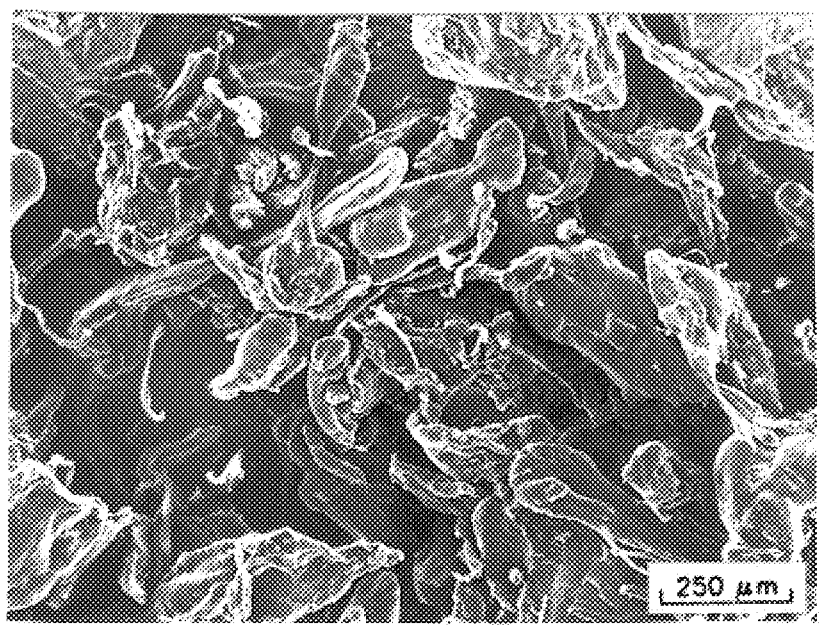
FIG. 2 is an electron micrograph of a mechanically cut powdered precursor (polyamide) material.

Morphology studies of the mechanically milled and mechanically cut powdered precursor materials were conducted, and electron micrographs thereof are provided in FIGS. 1 and 2 respectively.

As illustrated in FIG. 1, the mechanically milled powdered precursor material was found to be comprised of a conglomeration of larger particles being made up of many fine, small-sized particles. The overall average individual particle size was 3 μm. In contrast, as illustrated in FIG. 2, the characteristics of the mechanically cut powdered precursor material were quite different, revealing a particle size around 200 μm and clear boundaries of the particles were apparent. It is believed the conglomeration of particles and very coarse particle shape of the mechanically milled powdered precursor material compared to the sharply defined shape of the mechanically cut powdered precursor material is evidence that the former has been subjected to a significantly higher degree of repeated fracturing and cold welding known to occur in mechanical alloying processes. It should be appreciated that the mechanically cut powdered precursor material has also been subjected to fracturing, albeit to a different type of fracturing than the mechanically milled powdered precursor material.

The mechanically milled powdered precursor material was transferred to a consolidation press where it was maintained at 80° C. under vacuum for 20 hours to degas the material. Thereafter, the temperature was raised to 233° C. and a pressure of 68.95 MPa was applied for a period of 48 hours. At the end of consolidation, a solid billet of MMPA had been formed and was removed from the consolidation press for testing thereof.

The mechanically cut powdered precursor material was consolidated in a similar fashion. At the end of consolidation, a solid billet of MCPA had been formed and was removed from the consolidation press for testing thereof.

The samples were subjected to X-ray diffraction analysis to determine the crystal structure and relative crystallinity of the polymers therein. The other method utilized to measure relative crystallinity of the polymers in the samples was C-13 solid state Nuclear Magnetic Resonance (NMR).

Figure 3:
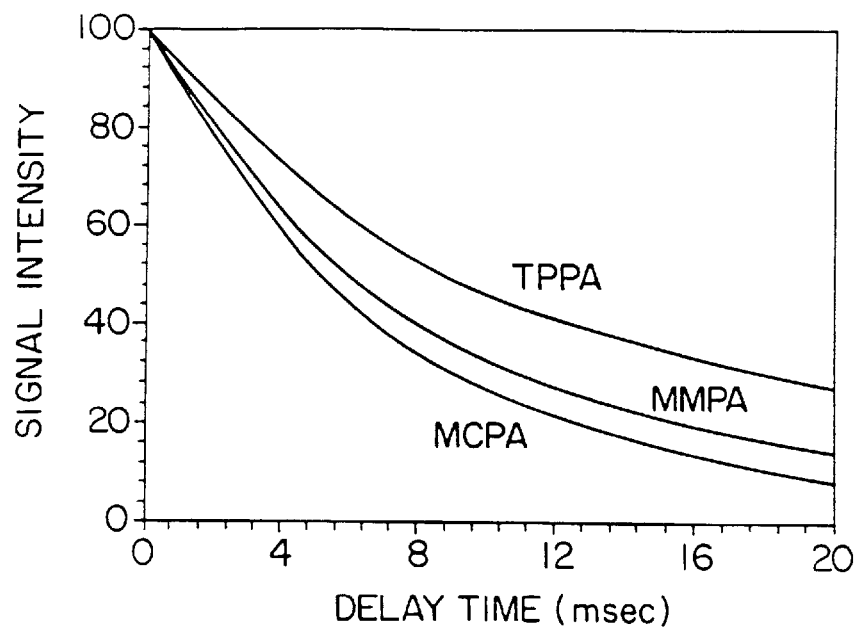
FIG. 3 is a graphical representation of C-13 solid state Nuclear Magnetic Resonance spectrometry results for a polymer alloy polyamide material and a thermally processed polyamide material.

The results of C-13 solid state NMR analysis are illustrated in FIG. 3. As is known, the analytical technique of C-13 solid state NMR is based on inserting a delay time signal after proton-carbon cross polarization to measure the relative crystallinity of polymers. Signals from amorphous materials delay more than those from crystalline materials. Thus, larger remaining signals imply higher crystallinity. As illustrated in FIG. 3, it is clear that the TPPA material has a much higher crystallinity than that of the MMPA and MCPA materials.

Similar results were also obtained in the X-ray diffraction analysis of the two materials, as shown in Table 1. The peak intensities of the TPPA material which reflect the relative crystallinity of the polymer are much higher than those of the MMPA and MCPA materials. Also apparent from the results in Table 1 is the fact that one peak is missing, the other peak is shifted and broadened for the MMPA material when compared to the MCPA and TPPA materials. This means that, when preceded by mechanical milling, the consolidation technique conducted has resulted in a large alteration of the crystal structure due to special reactions between molecules in the MMPA material.

TABLE 1

| MATERIAL | 2T ANGLE | SPACE (D) | INTENSITY |
|---|---|---|---|
| MMPA | 27.192 | 3.8050 | 1780 |
| MCPA | 27.523 | 3.7602 | 1720 |
|  | 23.731 | 4.3500 | 996 |
| TPPA | 27.710 | 3.7353 | 1450 |
|  | 23.569 | 4.3796 | 2111 |

The results of C-13 solid state NMR and X-ray diffraction analysis indicate that the crystalline structure of the MMPA and MCPA materials differs significantly from that of the TPPA material.

A solid billet of the MMPA material was cut and mounted in thermoset plastic with the longitudinal and transverse surfaces exposed. The exposed surfaces were ground and polished mechanically with a Buehler Ecomet 3 grinder-polisher using the following sequence: 400 grit, 600 grit, 6 $\mu$m, 1 $\mu$m and finally 0.05 $\mu$m. The polished surface was then etched with an etchant comprising concentrated xylene for a period of 4 minutes at 75° C. A solid billet of the TPPA material was polished and etched in a similar fashion.

Figure 4:
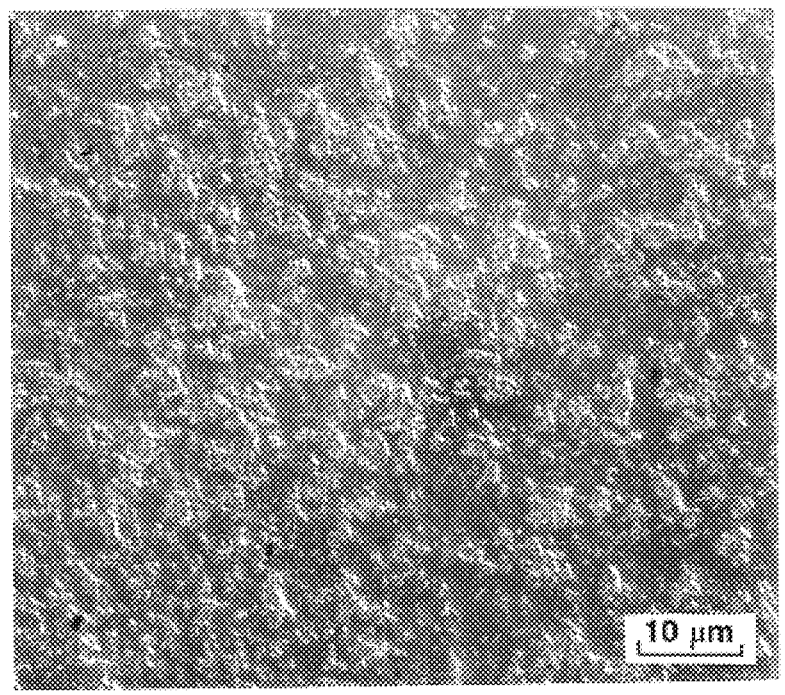
FIG. 4 is an optical micrograph of a polymer alloy polyamide material made using the powdered precursor material of FIG. 1.
Figure 5:
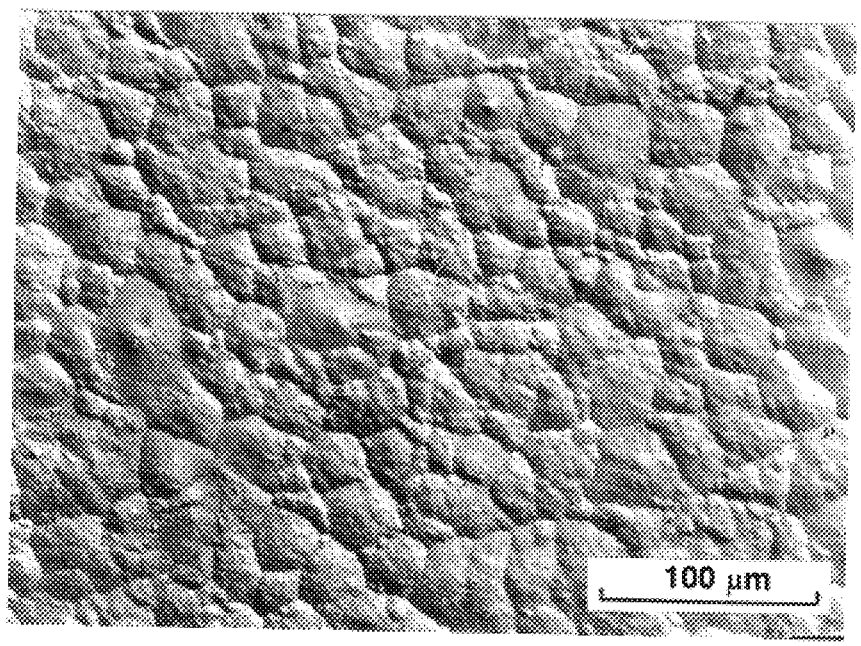
FIG. 5 is an optical micrograph of a thermally processed polyamide material.
Figure 7:
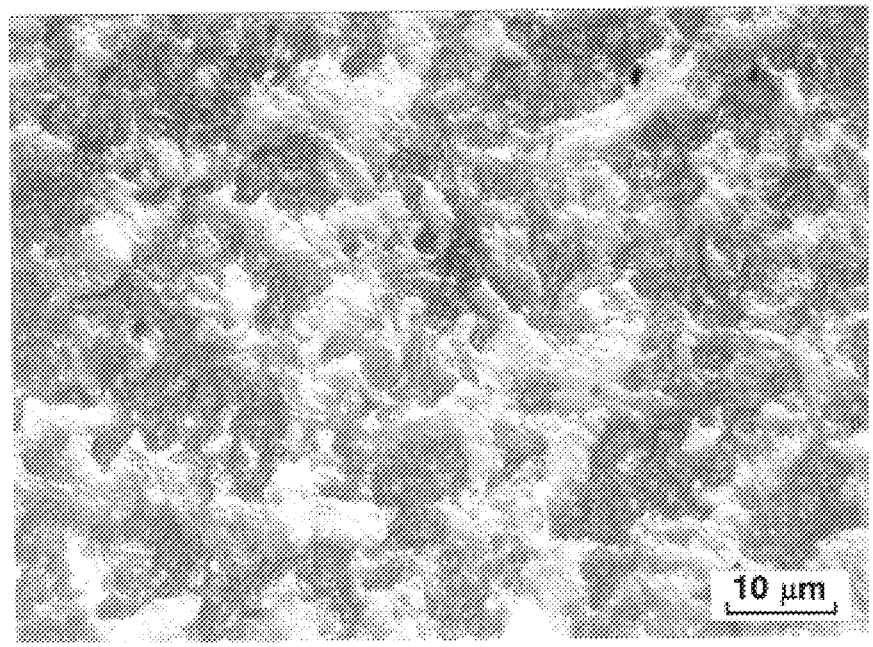
FIGS. 7–10 are optical micrographs of polymer alloy polyamide materials.
Figure 8:
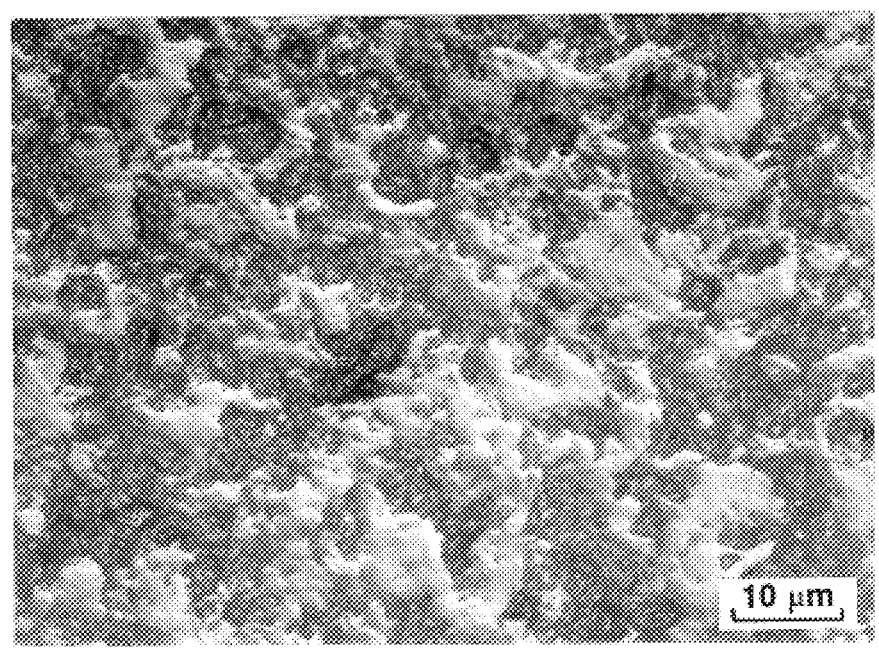
Figure 9:
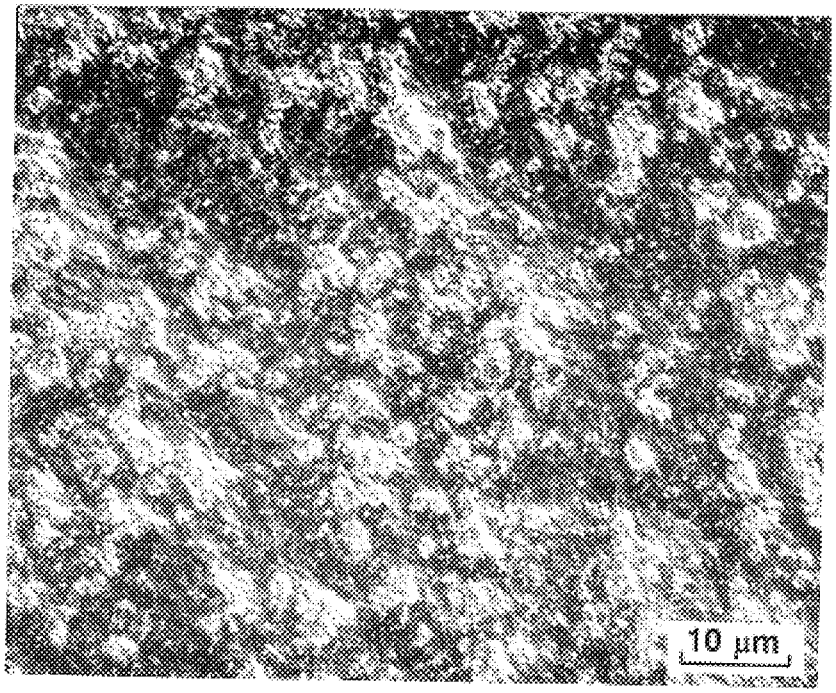
Figure 10:
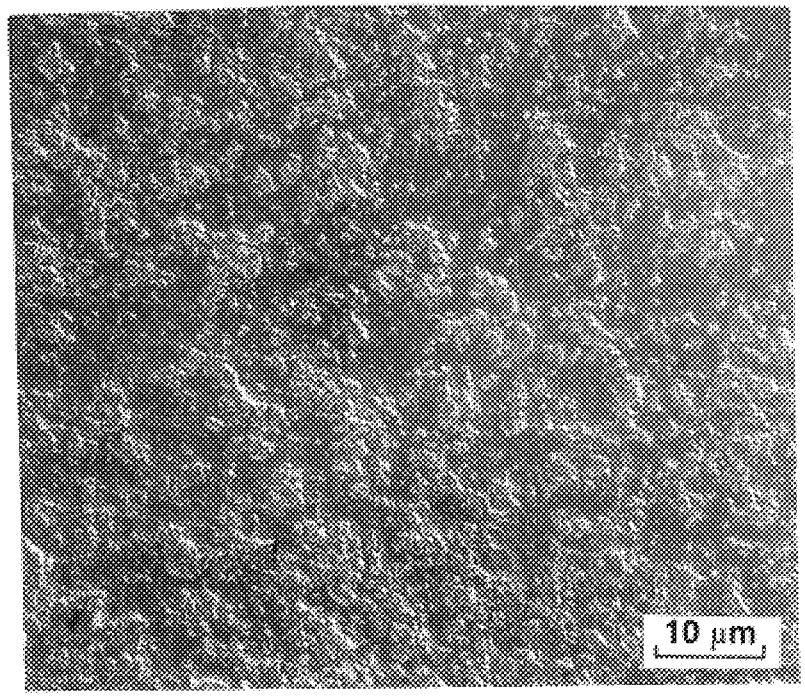
Figure 11:
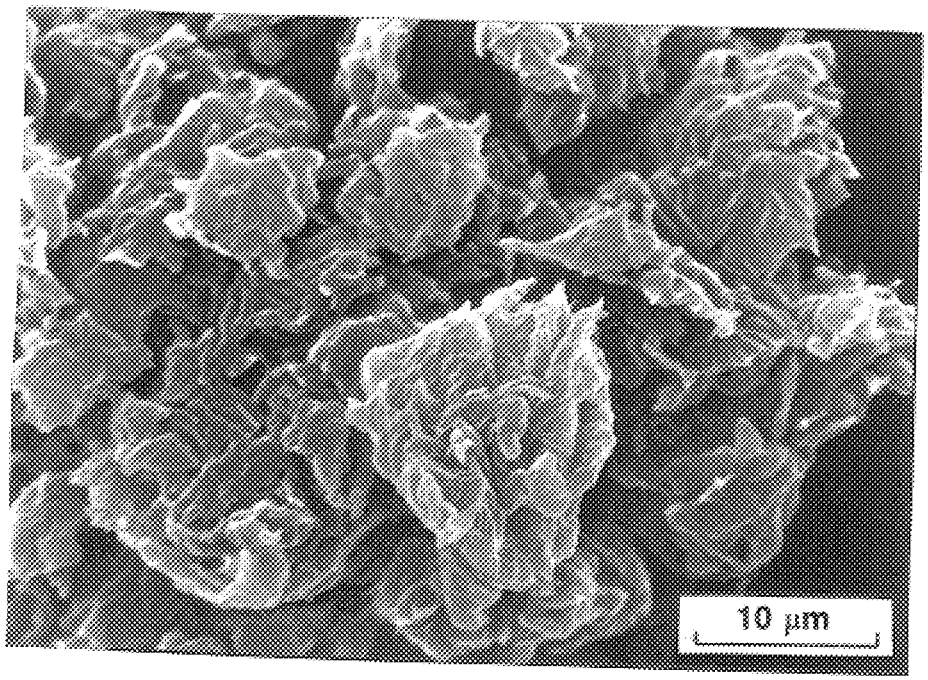
FIGS. 11–17 are electron micrographs of powdered precursor materials.
Figure 12:
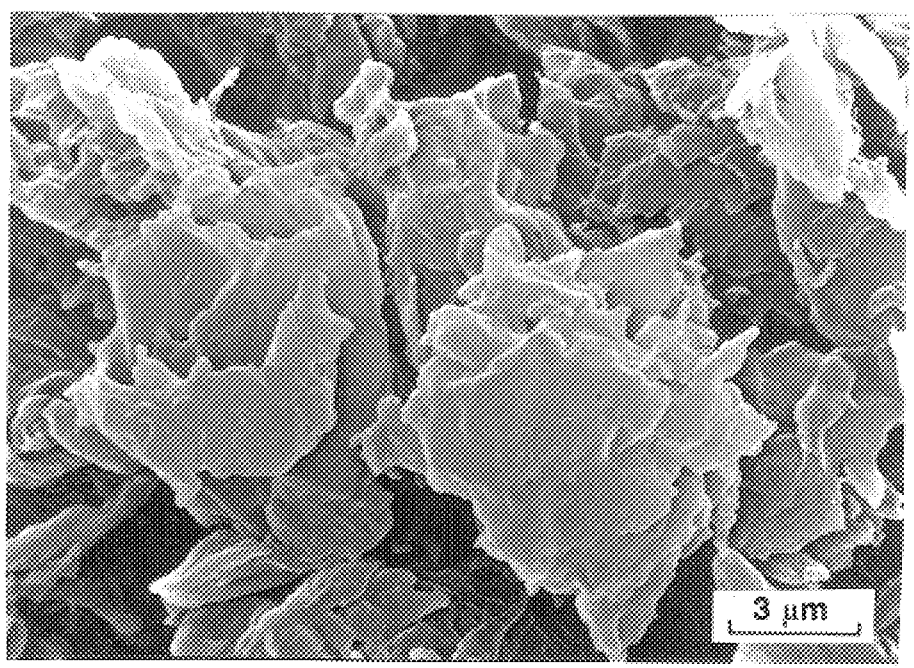

Optical micrographs were taken of the polished and etched billets of the MMPA material (FIG. 4) and the TPPA material (FIG. 5). The micrograph for TPPA (illustrated in FIG. 5) compared favourably with the features of similar material published by L. Bartoxiewicz, *J. Polym. Sci., Polym. Physics Edit.*, 12, 1163 (1974) and indicated that the TPPA material had a grain size of approximately 50 $\mu$m.

In contrast, as illustrated in FIG. 4, the microstructure of the MMPA material was completely different, having a grain boundary that was not clearly defined and a very small domain size (approximately 3 $\mu$m).

The mechanical properties of the MMPA, MCPA and TPPA materials were then measured and the results are provided in Table 2.

TABLE 2

|  | MMPA | MCPA | TPPA |
|---|---|---|---|
| Hardness (ASTM D785) | 89 ± 1 | 82 ± 1 | 79 ± 1 |
| Ultimate Strength, MPa (ASTM D695-85) | 146.38 ± 0.50 | 104.50 ± 3.17 | 125.35 ± 2.60 |
| Elongation, % (ASTM D695-85) | 24.9 ± 0.3 | 14.3 ± 0.5 | 34.3 ± 3.0 |

As shown in Table 2, significant increases in hardness and ultimate strength are achieved in the MMPA material as compared to the TPPA material.

EXAMPLE 2

The procedure described in Example 1 using the same type of reactor grade polyamide pellets described therein was repeated in this Example.

In this Example, the temperature of consolidation was varied to determine what effect, if any, it had on the properties of the MMPA material. The various consolidation temperatures used were: 100°, 140°, 185°, 233° and 250° C. to produce test billets as follows:

| Sample Number | Consolidation Temperature (°C.) |
|---|---|
| MMPA-1 | 100 |
| MMPA-2 | 140 |
| MMPA-3 | 185 |
| MMPA-4 | 233 |
| MMPA-5 | 250 |

As in Example 1, a portion of the polyamide pellets were thermoformed at 285° C. (melting point of material is 260° C.) using conventional techniques to produce a billet for testing purposes (Thermally Processed PolyAmide: TPPA).

Figure 6:
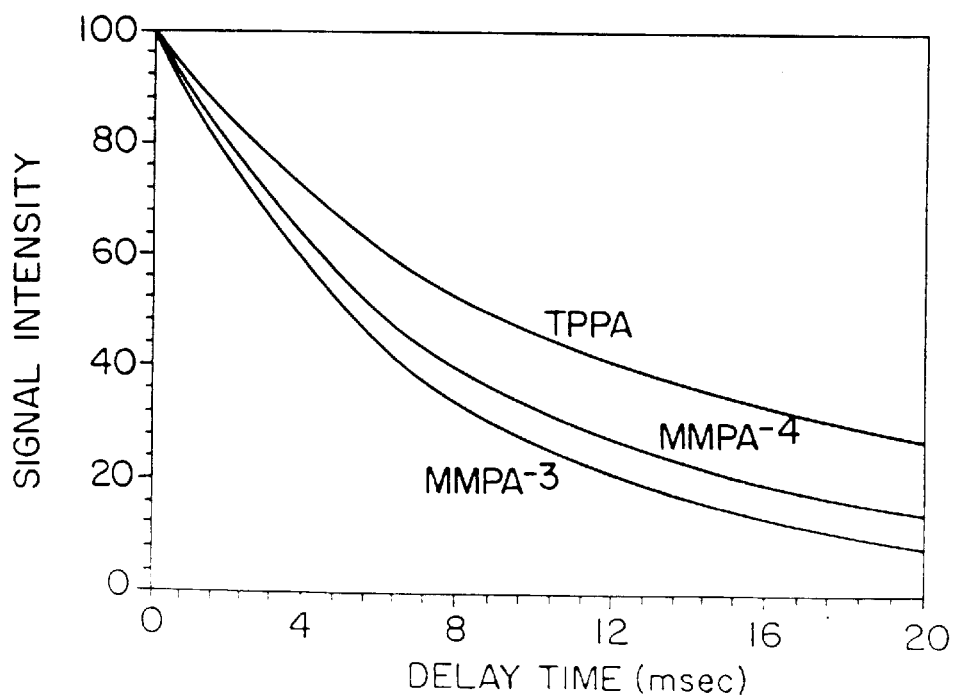
FIG. 6 is a graphical representation of C-13 solid state Nuclear Magnetic Resonance spectrometry results for two polymer alloy polyamide materials and a thermally processed polyamide material.

The C-13 solid sate NMR spectrometry results are illustrated in FIG. 6 for MMPA-3, MMPA-4 and TPPA. These results confirm that the TPPA material is much more crystalline in nature than either of the MMPA materials.

The results of X-ray diffraction analysis on various of the materials are provided in Table 3. The results shown in Table 3 show that:

1. As consolidation temperature increases, a corresponding increase in crystallinity of the MMPA material occurs as shown by the intensity of the diffracted X-rays.
2. Consolidation temperature has no significant effect on actual nature of the crystal structure as shown by the relatively consistent values for each of 2T angle and space.

TABLE 3

| MATERIAL | 2T ANGLE | SPACE (D) | INTENSITY |
|---|---|---|---|
| MMPA-5 | 27.613 | 3.7481 | 1986 |
| MMPA-4 | 27.192 | 3.8050 | 1780 |
| MMPA-3 | 27.557 | 3.7556 | 1640 |
| MMPA-2 | 27.337 | 3.7795 | 1304 |
| MMPA-1 | 27.035 | 3.8267 | 1164 |
| TPPA | 27.710 | 3.7353 | 1450 |
|  | 23.569 | 4.3796 | 2100 |

The results of hardness tests are found in Table 4 wherein it is apparent that the hardness of the MMPA material increases with the consolidation temperature. It is also apparent that, for each MMPA material tested, a hardness significantly higher than that of the TPPA material is achieved. Accordingly, mechanical alloying of the polyamide has the effect of strengthening the material when compared to thermal processing thereof.

The results of ultimate strength and ductility tests are provided in Table 5 wherein it is apparent that with the increase in consolidated temperature in producing the MMPA material, a relative increase in each of ultimate strength and fracture elongation is achieved. These results support the conclusion that, for optimum processing conditions, mechanical alloying of the polymer has resulted in a strengthened material.

TABLE 4

| MATERIAL | HARDNESS |
|---|---|
| MMPA-5 | 91.5 |
| MMPA-4 | 89 |
| MMPA-3 | 88 |
| MMPA-2 | 86 |
| MMPA-1 | 84 |
| TPPA | 79 |

TABLE 5

| MATERIAL | ULTIMATE STRENGTH (MPa) | ELONGATION (%) |
|---|---|---|
| MMPA-5 | 160.42 | 25.40 |
| MMPA-4 | 146.38 | 24.90 |
| MMPA-3 | 144.50 | 19.20 |
| MMPA-2 | 125.19 | 16.70 |
| MMPA-1 | 109.25 | 13.81 |
| TPPA | 125.35 | 34.30 |

While not wishing to be bound by any particular theory or mode of action it is believed that in present process of mechanical alloying, the polymers are milled in a manner resulting in extremely fine powders by the mechanism of repeated welding, fracturing and rewelding thereof, whereby the polymer particles become deformed. These fine powders haven energy stored therein. After a period of milling, the rates of welding and fracturing substantially equilibrate resulting in very complicated interactions between polymer molecules.

Optical micrographs of various of the MMPA materials were taken after polishing and etching thereof (as described in Example 1), and are illustrated herein as follows:

| Sample Number | Figure |
|---|---|
| MMPA-1 | 7 |
| MMPA-2 | 8 |
| MMPA-3 | 9 |
| MMPA-5 | 10 |

In contrast to micrograph for TPPA (see FIG. 5 in Example 1), the micrographs illustrated in FIGS. 7–10 are completely different and reveal that each of MMPA materials therein have grain boundaries which are not clearly defined. It is apparent that as consolidating temperature is increased, the resulting MMPA material has a more uniform distribution and a smaller defined structure.

EXAMPLE 3

The procedure described in Example 1 using the same type of reactor grade polyamide pellets described therein and, additionally, using XXLP, a high density polyethylene commercially available from E.I. duPont de Nemours & Co., was repeated in this Example. Additionally, a powdered precursor material was prepared based on a 50:50 weight percent mixture of each polymer.

The polymer samples were milled in accordance with the procedure described in Example 1. Morphology studies of the powdered precursor materials were conducted and electron micrographs thereof are provided herein as follows:

| Sample | Figure |
|---|---|
| Polyamide | 1* |
| Polyethylene | 11 |
| Polyamide/polyethylene mixture | 12 |

*from Example 1

As illustrated in these Figures, the polymer particles are actually a conglomeration of larger particles made up of many fine, small-sized particles. These Figures support the conclusion that the polymers have undergone the mechanism of fracture and cold welding known to occur in mechanical alloying processes.

The powder precursor materials had the following approximate average particle sizes:

| Sample | Particle Size |
|---|---|
| Polyamide | 3 $\mu$m |
| Polyethylene | 5 $\mu$m |
| Polyamide/polyethylene mixture | 3 $\mu$m |

These powdered precursors materials would be useful in producing polymer alloy materials in accordance with the present invention.

EXAMPLE 4

The polymers used in this Example were the polyamide nylon 6,6 (PA, same as in Example 1) and acrylonitrile-butadiene-styrene (ABS) polymer in the form of commercially available pipe containing carbon black filler.

Reactor grade PA pellets and small pieces of ABS were mechanically milled in a high energy ball mill (see Pan et al., J. Appl. Polym. Sci., 52, pg. 507 (1994), the contents of which are hereby incorporated by reference) at an overall acceleration of 12.3 g's (120.54 m/s$^2$) at a frequency of 29

Hz. The ball mill was cooled using an exterior heat exchanger through which liquid nitrogen was passed to obtain a temperature less than −150° C. (i.e. approximately 200° and 250° C. less than the glass transition temperatures of PA and ABS, respectively).

Figure 13:
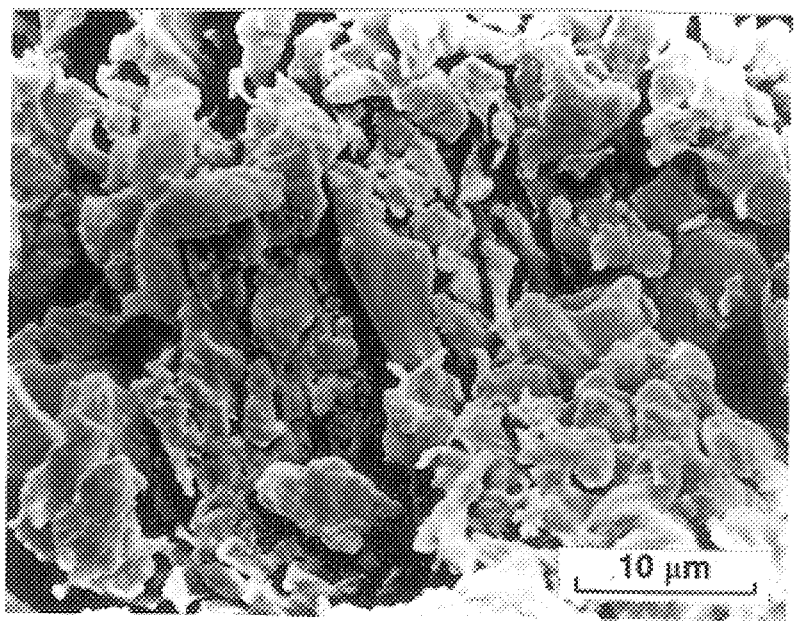

PA was processed alone for 24 hours. Powder morphology studies of the processed PA were conducted and FIG. 13 illustrates the results. The average particle size of the particles was 3 μm. As illustrated in FIG. 13, the processed PA was found to comprise particles wherein each particle is an agglomeration of fine, small-sized particles.

Figure 14:
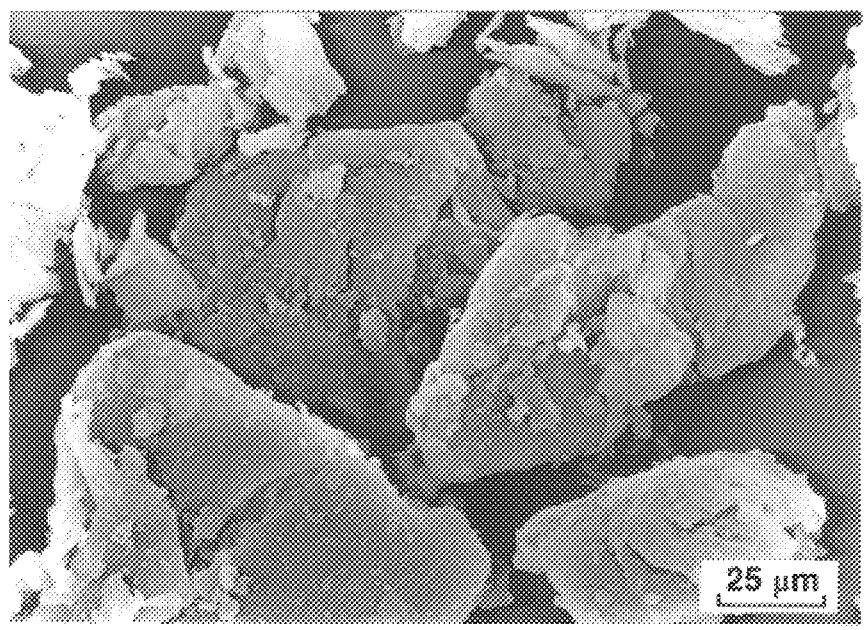

ABS was processed alone for 8 hours. Powder morphology studies of the processed ABS were conducted and FIG. 14 illustrates the results. The average particle size of the particles was 60 μm. As illustrated in FIG. 14, the particles do not appear to have a layer structure and there is considerable variation in the particle size. Notwithstanding this, as is apparent, the particles in FIG. 14 are an agglomeration of fine, small-sized particles.

Both FIGS. 13 and 14 support the conclusion that the samples depicted therein have undergone repeated fracturing and cold welding.

The processed PA and ABS were mixed in the following specific proportions and processed in the ball mill for an additional period of 24 hours:

| Sample | PA/ABS Proportion (wt. %) |
|--------|---------------------------|
| MA-1   | 35/65                     |
| MA-2   | 50/50                     |
| MA-3   | 65/35                     |

Figure 15:
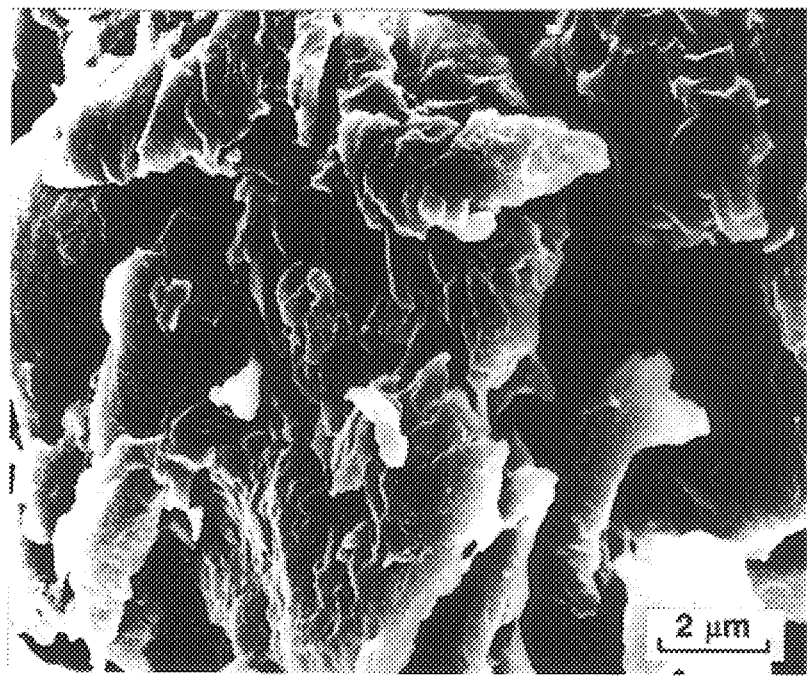
Figure 16:
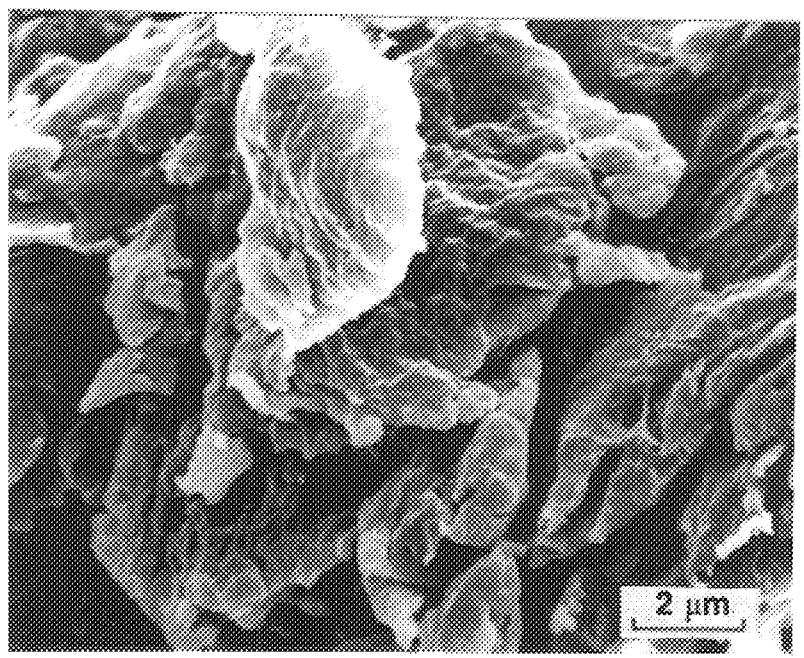
Figure 17:
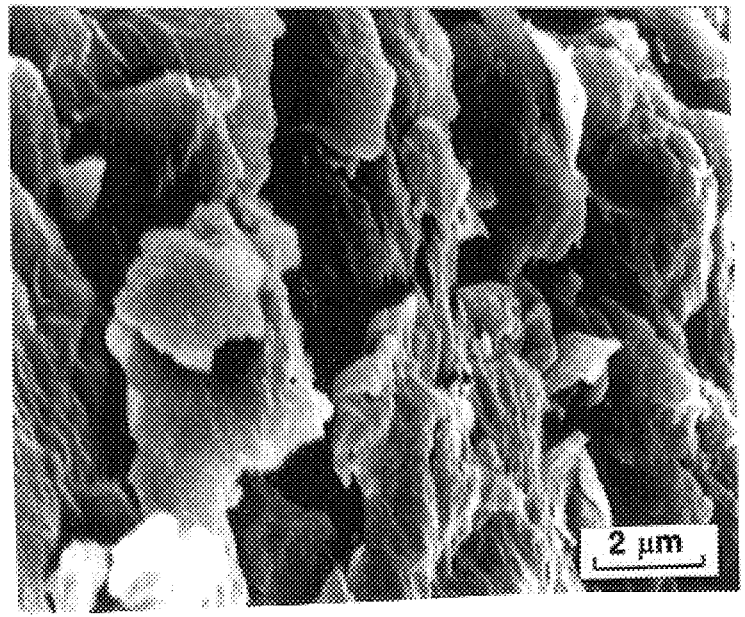

Morphology studies of Samples MA-1, MA-2 and MA-3 were conducted and the results are illustrated in FIG. 15, 16 and 17, respectively. As illustrated in FIG. 15–17, each of Samples MA-1, MA-2 and MA-3 are extremely fine and have a homogeneous particle size distribution with an average particle size of approximately 2 μm. Each Sample is made up of a powder having the features of a very coarse particle shape and many layers of structure indicative of an agglomeration of fine, small-sized particles.

Samples MA-1, MA-2 and MA-3 were consolidated in the following manner. Each Sample was transferred to a consolidation press wherein it was pretreated at a temperature of 80° C. under vacuum conditions for 20 hours to degas the Sample. Thereafter, the temperature was increased to 162° C. and a pressure of 86.95 MPa was applied for a period of 48 hours. This resulted in production of a polymer alloy which was then removed from the consolidation press. Samples of 100% PA (MAPA) and 100% ABS (MAABS) were consolidated in a similar manner at temperatures of 233° C. and 200° C., respectively.

For comparison, thermal melt PA (TMPA), thermal melt ABS (TMABS) and thermal melt PA/ABS (TMPAABS; 65/35 wt. % PA/ABS) were consolidated in a similar fashion at temperatures of 285° C., 252° C. and 270° C., respectively.

Figure 18:
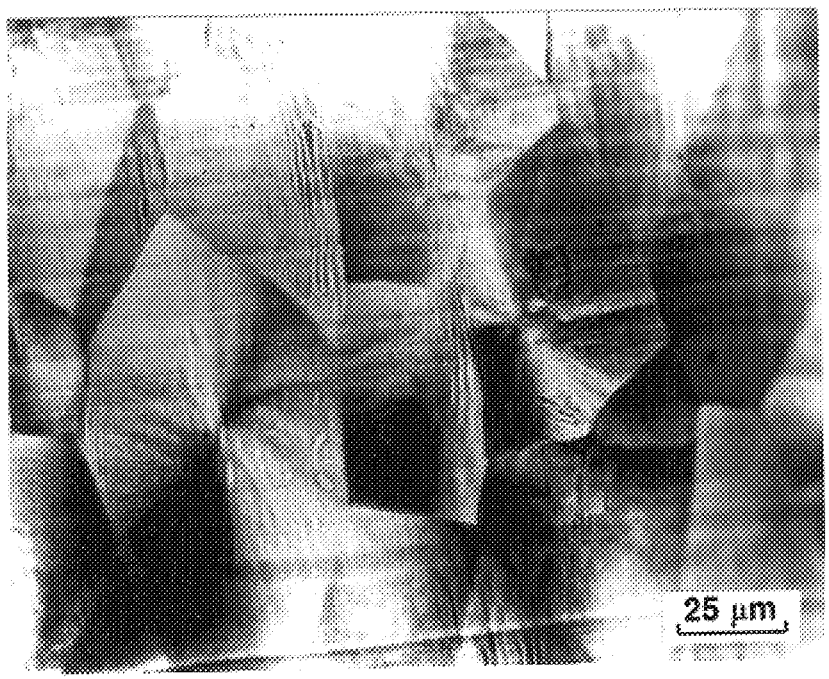
FIG. 18 is an optical micrograph of a thermally processed polyamide material.

FIG. 18 illustrates an optical micrograph of TMPA. As illustrated, TMPA has the characteristics of a spherulitic structure and the cell size is approximately 60 μm. This is in general agreement with the features of a similar material studied by others (Bartoxiewicz et al, *J. Polym. Sci., Polym. Physics Edit.*, 12, pg. 1163 (1974), the contents of which are hereby incorporated by reference).

Figure 19:
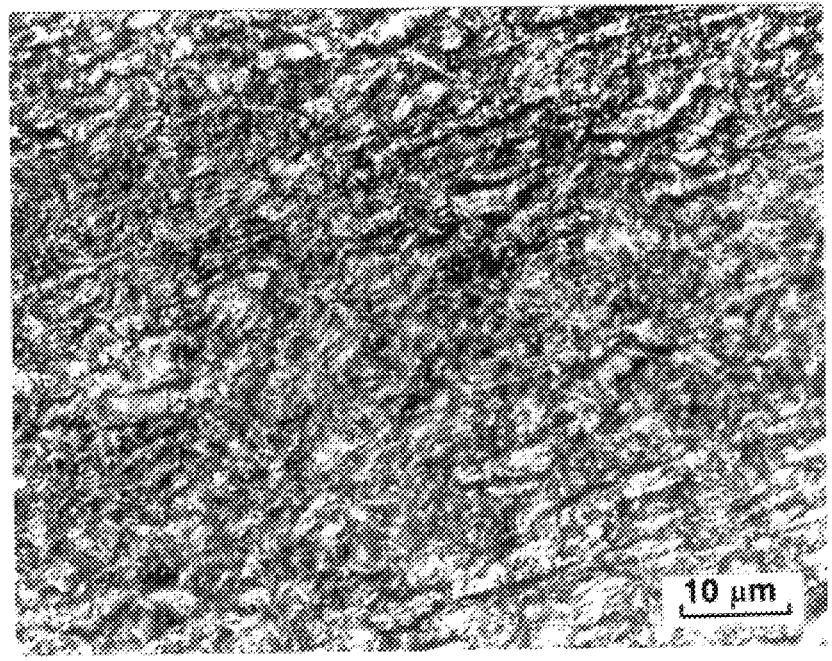
FIGS. 19–22 are optical micrographs of various polymer alloy materials.

In contrast, the optical microstructure of MAPA is shown in FIG. 19. As shown, large differences can be found comparing the optical microstructures of MAPA (FIG. 19) and TMPA (FIG. 18). Specifically, MAPA has no clear grain boundary which is apparent. A small grain structure is a principal characteristic of the polymer alloy material.

The TMABS material is amorphous in nature and no microstructural characteristics could be found.

Figure 20:
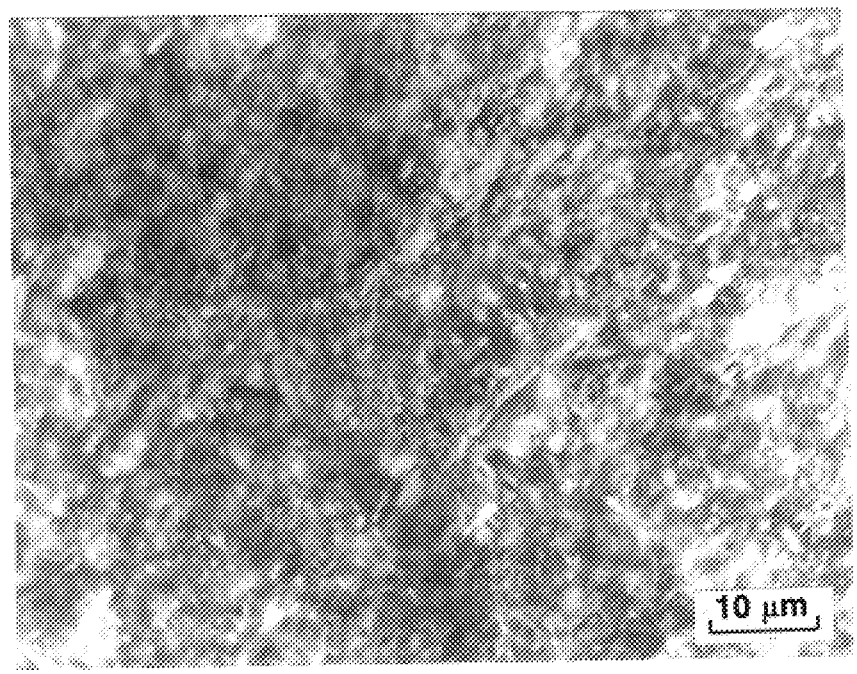
Figure 21:
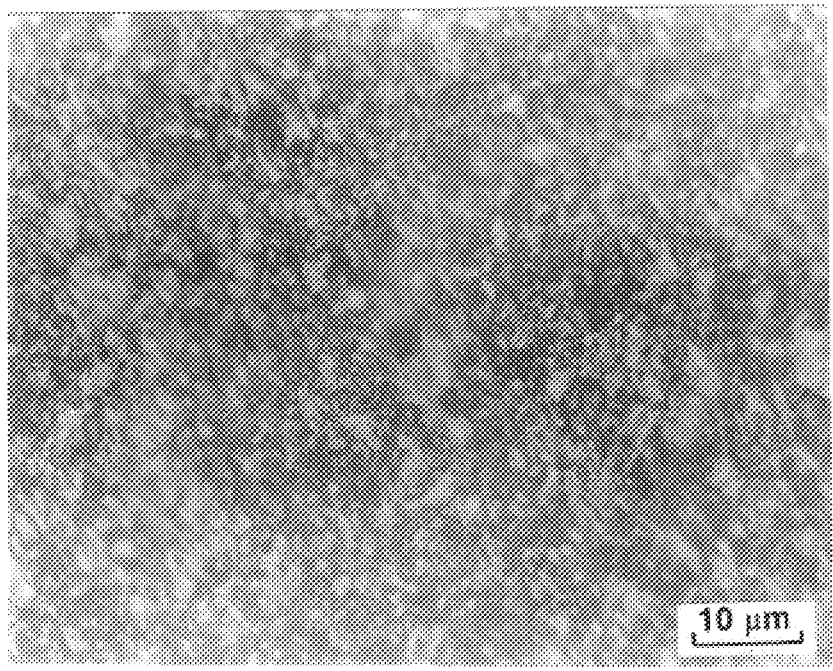
Figure 22:
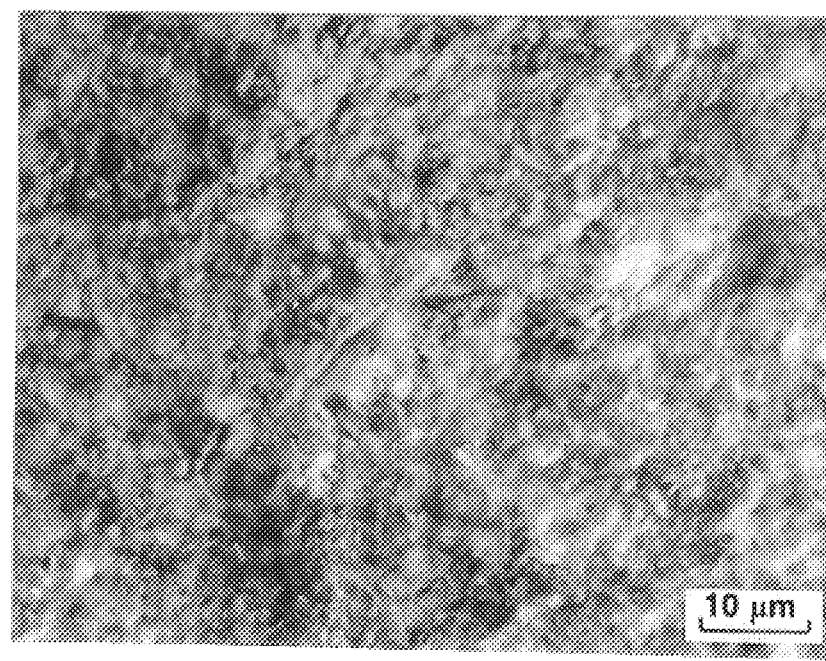

The phenomenon of immiscibility directly visible by the eye was apparent in the TMPAABS sample due to thermal incompatibility of the PA and ABS polymer components. It was found that a portion (ABS) of the solid billets was over-melted and had a dark colour; while another portion (PA) had not melted completely and was white in colour. This kind of incomplete mixture results in a material with no practical utility in engineering applications. In contrast, for Samples MA-1, MA-2 and MA-3, a homogenous billet was produced in an even state. Optical micrographs of Samples MA-1, MA-2 and MA-3 viewed by polarized light are provided in FIGS. 20, 21 and 22, respectively. As in FIG. 19, the characteristics of no clear grain boundary and very small grain size were present. This microstructural study indicates that polymeric alloy materials with unique structural characteristics have been produced as a result of mechanical milling and consolidation.

EXAMPLE 5

Various samples of polyamide nylon 6,6 (PA) were mechanically milled using the methodology of Example and varying the processing time as follows:

| Sample | Processing Time (hr) |
|--------|----------------------|
| PA-1   | 1                    |
| PA-2   | 3                    |
| PA-3   | 6                    |
| PA-4   | 12                   |
| PA-5   | 18                   |
| PA-6   | 24                   |

The mechanically processed PA samples were then transferred to a consolidation press similar to the one described in the previous Examples. The PA samples were consolidated into solid billets at 233° C. (note: melting point of PA is 265° C.) at a pressure of 68.95 for a period of 48 hours.

A compressive stress-strain test was conducted on each of the consolidated billets. The results are provided in Table 6 and indicate enhancement of ultimate strength and elongation with increasing mechanical milling from 1 to 12 hours (i.e. Samples 1–4). Ultimate strength and elongation continue to increase for Samples which were mechanically milled for 12–24 hours (i.e. Samples 5 and 6) although though increase is not quite as considerable.

Figure 23:
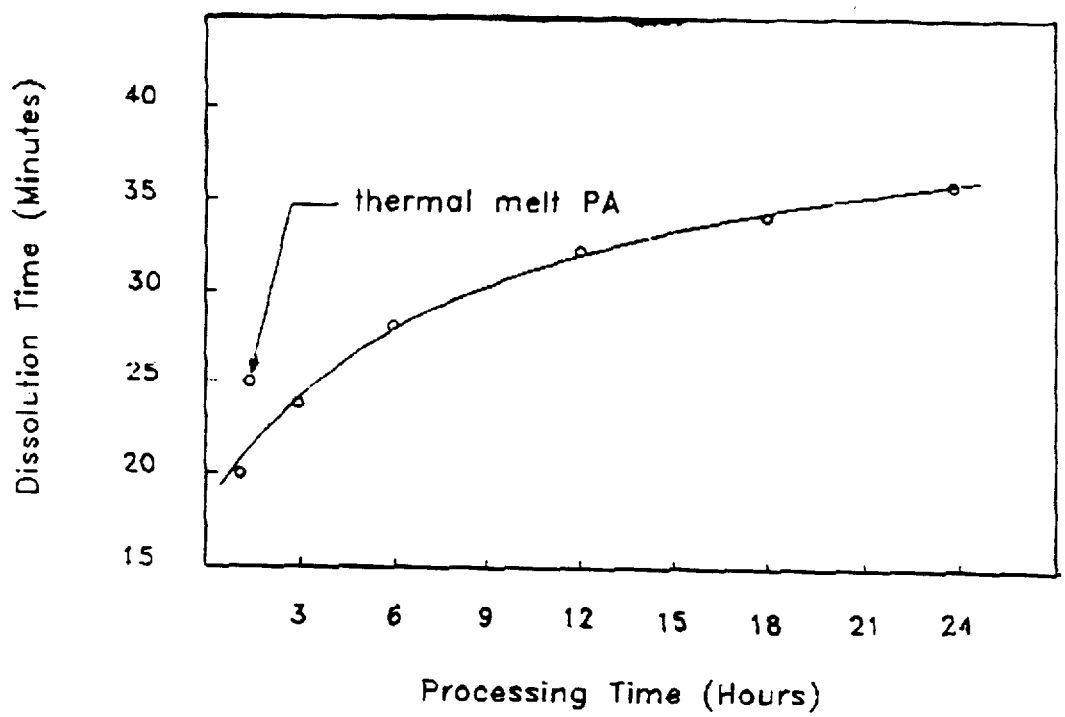
FIG. 23 is a plot of dissolution time versus mechanical milling period for various polymer alloy materials.

The consolidated billets were also subjected to a solvent dissolution test to study the change of the degree of interface reactions with increasing periods of mechanical milling. Thus, each Sample was cut into a cubic shape with having the dimensions: 3×3×3 mm. The Sample was then placed in 100 mL formic acid solvent and the dissolution time was determined. The test was repeated three times for each Sample and the average dissolution time for each Sample was recorded and plotted versus the period of mechanical milling. FIG. 23 illustrates the results and includes the dissolution time of thermal melt PA. The results of this study support the conclusion that the degree of interface reactions between particles of mechanical milled materials increases with increased mechanical milling.

TABLE 5

| Sample | Ultimate Strength (MPa) | Elongation (%) |
|---|---|---|
| PA-1 | 101.3 ± 1.2 | 12.7 ± 0.9 |
| PA-2 | 119.6 ± 0.9 | 16.4 ± 0.8 |
| PA-3 | 133.5 ± 1.8 | 19.3 ± 1.1 |
| PA-4 | 141.7 ± 2.4 | 22.9 ± 1.9 |
| PA-5 | 145.2 ± 1.8 | 24.0 ± 1.0 |
| PA-6 | 146.4 ± 0.5 | 24.9 ± 0.3 |

Sample PA-6 was consolidated using the procedure described above in the Example at the following temperatures: 100° C., 140° C., 185° C., 233° C. and 250° C. In each case, a solid billet was produced. In the case of consolidation at 100° C., a solid billet was product at a temperature 165° C. below the material melting point (i.e. 265° C.). For comparison purposes, reactor grade PA pellets (i.e. not subjected to mechanically milling) were consolidated using the same technique. The lowest temperature at which a solid billet could be produced was found to be 285° C.

Thus, low temperature (i.e. sub-melting point of material) consolidation of mechanically milled PA is surprising and unexpected. Generally, it is known that the driving force for polymeric particle bonding at temperatures below the melting point of the material is surface tension rather than diffusion. Diffusion is the dominant mechanism in metal (Geach et al., *Powder Metallurgy Science,* Interscience Publishers, New York, pg. 201 (1961), the contents of which are hereby incorporated by reference). The characteristic of the present mechanically milled polymeric materials is that they have been subjected to repeated fracturing and cold welding due to mechanical processing resulting in particles having a relatively high surface tension and highly active surfaces. It is believed that surface tension is not the only important property of the material since increased strength of the material is thought to be derived from interfacial reactions resulting from repeated fracturing/cold welding during mechanical milling.

In order to confirm that the mechanically milled polymer materials have energy stored therein, a density study was conducted. This involved obtaining density measurements for Sample PA-6 consolidated at the various Consolidation Temperatures (CT) and comparing this with the density of conventional thermal melt PA (TMPA) consolidated at 285° C. The results are provided in Table 7.

TABLE 7

| Material | CT (°C.) | Density (g/cm$^3$) |
|---|---|---|
| PA-6 | 100 | 1.022 |
| PA-6 | 140 | 1.070 |
| PA-6 | 185 | 1.100 |
| PA-6 | 233 | 1.120 |
| PA-6 | 250 | 1.136 |
| TMPA | 285 | 1.167 |

As is evident from Table 7, the density of consolidated polymer alloy derived from the mechanically milled material increases with increasing consolidation temperature. Normally, diffusion will not occur to any noticeable degree in a solid polymer, rather the material must be melted. Thus, it may be concluded that internal energy is stored in the mechanically milled material which, when combined with low temperature heat energy allows diffusion or movement of the ends of the polymers chains to occur. This model is in accordance with observations made by other investigators (e.g. Wool et al., *Macromolecules,* 26 (19), pg. 5227 (1993), the contents of which are hereby incorporated by reference).

Generally, higher consolidation or consolidation/heat treatment (i.e. maintaining the consolidated material at elevated temperature below the melt point of the polymer for a period of time at otherwise ambient conditions) temperatures lead to higher mobility of molecular segments and chains as well as the formation of better bonding and higher resultant strengths. Thus, long chain molecules tend to move to fill molecular voids and materials with higher density are obtained. It should be noted that polymer alloy materials made from the mechanically milled polymer particles are free small voids or porosity when view at high magnification using a Scanning Electron Microscope. Further, the high pressure and temperature combination used to produce the polymer alloys results in material creep which in turn eliminates microscopic voids after a short period of time during consolidation. Rather, any voids or spaces are believed to be present at a molecular level. The results in polymer alloy materials having an improved strength to weight ratio compared to corresponding thermal melt materials.

What is claimed is:

1. A powdered polymeric material, the polymeric material comprising polymer particles (i) having an average particle size less than about 1000 µm; (ii) which are made up of a plurality of smaller particles; and (iii) having energy stored therein;

wherein the polymer particles are characterized as having energy stored therein when the powdered polymeric material per se is capable of being consolidated to a solid at a pressure of at least about 5 MPa and at a temperature below the melting point of the polymeric material.

2. The powdered polymeric material defined in claim 1, wherein the polymer particles have an average particle size in the range of from about 0.1 µm to about 200 µm.

3. The powdered polymeric material defined in claim 1, wherein the polymer particles have an average particle size in the range of from about 0.1 µm to about 50 µm.

4. The powdered polymeric material defined in claim 1, wherein the polymer particles have an average particle size in the range of from about 0.1 µm to about 10 µm.

5. The powdered polymeric material defined in claim 2, wherein the polymer particles consist essentially of a single polymer.

6. The powdered polymeric material defined in claim 2, wherein the polymer particles consist essentially of a mixture of two or more polymers.

7. The powdered polymeric material defined in claim 1, wherein the polymer particles are selected from the group consisting of polycarbonate, poly(methyl methacrylate), poly(amide-imide), polyacryleneketone, poly(acrylonitrile-butadiene-styrene), polyetheretherketone, polyphenol-formaldehyde), polyphenol, polyester, polacrylate, polyeryl sulfone, poly(ether-imide), polyether sulfone, poly(ethylene terephthalate), polyacrylonitrile, polyamide, polystyrene, poly(vinyl chloride), poly(vinyl alcohol), polychlorotrifluoroethylene, epoxy, polycyanate, polymethylpentene, poly(vinyl acetate), poly(vinylidene chloride), poly(vinyl fluoride), polychloroprene, poly (vinylidene fluoride), poly(ethylene oxide), polyoxymethylene, polyisoprene, polyisobutylene, polyethylene, polybutadiene and substituted derivatives thereof.

8. The powdered polymeric material defined in claim 1, wherein the polymer particles are selected from the group consisting of EPON, cellulose acetate, nylon 6,6, ionomers, cellulose propionate, nylon 6, polyvinyl butyral, cellulose nitrate, poly(vinyl formate), cellulose acetate butyrate, ethyl cellulose, nylon 11, polyimides, melamine-phenol resin, melamine-formaldehyde resin, polymethyl methacrylate, acrylonitrile-butadiene-styrene, polyoxymethylene, nylon 12, poly(aryl ether), polysulfones, polyesters, polycarbonates and substituted derivatives thereof.

9. The powdered polymeric material defined in claim 2, wherein the polymer particles consist essentially of polyamide.

10. The powdered polymeric material defined in claim 1, wherein the polymer particles have energy stored therein when the powdered polymeric material is capable of being consolidated at a pressure of at least about 70 kPa and a temperature of at least about 25° C. below the melting point of the polymeric material.

11. The powdered polymeric material defined in claim 1, wherein the polymer particles have energy stored therein when the powdered polymeric material is capable of being consolidated at a pressure of at least about 70 kPa and a temperature of at least about 70° C. below the melting point of the polymeric material.

12. The powdered polymeric material defined in claim 1, wherein the polymer particles have energy stored therein when the powdered polymeric material is capable of being consolidated at a pressure of at least about 70 kPa and a temperature of at least about 100° C. below the melting point of the polymeric material.

13. A mechanically milled powdered polymeric material, the polymeric material comprising polymer particles (i) having an average particle size less than about 1000 $\mu$m; (ii) which are made up of a plurality of smaller particles; and (iii) having energy stored therein;

wherein the polymer particles are characterized as having energy stored therein when the powdered polymeric material per se is capable of being consolidated to a solid at a pressure of at least about 5 MPa and at a temperature below the melting point of the polymeric material.

* * * * *

UNITED STATES PATENT AND TRADEMARK OFFICE
CERTIFICATE OF CORRECTION

PATENT NO. : 5,874,521      Page 1 of 1
DATED : February 23, 1999
INVENTOR(S) : William J.D. Shaw It is certified that error appears in the above-identified patent and that said Letters Patent is hereby corrected as shown below:

Title page,
Item [54], "POLYMER AHOY MATERIAL AND PROCESS FOR PRODUCTION THEREOF" should read -- POLYMER ALLOY MATERIAL AND PROCESS FOR PRODUCTION THEREOF --.

Signed and Sealed this

Eighteenth Day of December, 2001

Attest:

Attesting Officer

JAMES E. ROGAN
Director of the United States Patent and Trademark Office